(12) United States Patent
Hara

(10) Patent No.: US 12,392,382 B2
(45) Date of Patent: Aug. 19, 2025

(54) SINTERED MEMBER AND ELECTROMAGNETIC COUPLING

(71) Applicant: Sumitomo Electric Sintered Alloy, Ltd., Takahashi (JP)

(72) Inventor: Junpei Hara, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 741 days.

(21) Appl. No.: 17/762,734

(22) PCT Filed: Aug. 17, 2020

(86) PCT No.: PCT/JP2020/031031
§ 371 (c)(1),
(2) Date: Mar. 23, 2022

(87) PCT Pub. No.: WO2021/065221
PCT Pub. Date: Apr. 8, 2021

(65) Prior Publication Data
US 2022/0333653 A1    Oct. 20, 2022

(30) Foreign Application Priority Data

Oct. 3, 2019  (JP) .................. 2019-182666

(51) Int. Cl.
*F16D 27/112*    (2006.01)
*B22F 5/08*    (2006.01)
*C22C 38/44*    (2006.01)

(52) U.S. Cl.
CPC .............. *F16D 27/112* (2013.01); *B22F 5/08* (2013.01); *C22C 38/44* (2013.01); *B22F 2301/35* (2013.01); *F16D 2200/0021* (2013.01)

(58) Field of Classification Search
CPC .. F16D 27/112; F16D 2200/0021; B22F 5/08; B22F 2301/35; C22C 38/44
(Continued)

(56) References Cited

U.S. PATENT DOCUMENTS 5,142,943 A * 9/1992 Hughes ................ F16D 43/215
                                                          192/93 A
8,444,523 B2 * 5/2013 Jurjanz ................ F16H 25/186

FOREIGN PATENT DOCUMENTS

JP         62-80060 U      5/1987
JP         7-158417 A      6/1995
(Continued)

*Primary Examiner* — Greg Binda
(74) *Attorney, Agent, or Firm* — XSENSUS LLP

(57) ABSTRACT

A sintered member having an annular shape, includes: a first face facing one side in an axial direction; a second face facing the other side in the axial direction; an inner peripheral face connected to an inner peripheral edge of the first face; and a plurality of tooth groups and a plurality of tooth-missing parts which are alternately disposed along a circumferential direction of the inner peripheral face. The second face includes a plurality of ball grooves arranged in parallel in the circumferential direction. Each tooth group includes a plurality of spline teeth that are continuous in the circumferential direction of the peripheral face. The number of plurality of tooth-missing parts is the same as the plurality of ball grooves. Positions in a radial direction in which the plurality of tooth-missing parts are formed are within ranges in the radial direction in which the ball grooves are formed.

12 Claims, 11 Drawing Sheets

(58) Field of Classification Search
USPC .............................................. 192/69.5, 93 A
See application file for complete search history.

(56) References Cited

FOREIGN PATENT DOCUMENTS

| | | |
|---|---|---|
| JP | 2002-178092 A | 6/2002 |
| JP | 2012-167783 A | 9/2012 |
| JP | 2017-133660 A | 8/2017 |

* cited by examiner

500 μm

200 μm

500 μm

200 μm

500 μm

500 μm

SINTERED MEMBER AND ELECTROMAGNETIC COUPLING

CROSS-REFERENCE TO RELATED APPLICATIONS

The present application is based on PCT filing PCT/JP2020/031031, filed Aug. 17, 2020, which claims priority to Japanese Patent Application No. 2019-182666, filed on Oct. 3, 2019, the entire contents of each are incorporated herein by reference.

TECHNICAL FIELD

The present invention relates to a sintered member and an electromagnetic coupling.

BACKGROUND ART

PATENT LITERATURE 1 discloses a drive force transmission device (electromagnetic coupling) for connecting and disconnecting a propeller shaft and a rear differential of a four-wheel drive vehicle. The driving force transmission device includes a first cam mechanism. The first cam mechanism includes a main cam (first cam), a pilot cam (second cam), and a cam ball interposed between the main cam and the pilot cam.

CITATION LIST

Patent Literature

PATENT LITERATURE 1: Japanese Laid-Open Patent Publication No. 2012-167783

SUMMARY OF THE INVENTION

A sintered member according to the present disclosure is a sintered member having an annular shape. The sintered member includes a first face facing one side in an axial direction; a second face facing the other side in the axial direction; an inner peripheral face connected to an inner peripheral edge of the first face; and a plurality of tooth groups and a plurality of tooth-missing parts which are alternately disposed along a circumferential direction of the inner peripheral face. In the sintered member, the second face includes a plurality of ball grooves arranged in parallel in the circumferential direction. In the sintered member, each tooth group includes a plurality of spline teeth that are continuous in the circumferential direction of the peripheral face. In the sintered member, the number of the plurality of tooth-missing parts is the same as the number of the plurality of ball grooves. In the sintered member, positions in a radial direction in which the plurality of tooth-missing parts are formed are within ranges in the radial direction in which the plurality of ball grooves are formed. In the sintered member, ranges in the circumferential direction in which the plurality of tooth-missing parts are formed overlap ranges in the circumferential direction in which the plurality of ball grooves are formed.

An electromagnetic coupling according to the present disclosure is an electromagnetic coupling including a first cam, a second cam, and a ball interposed between the first cam and the second cam, and the first cam is composed of the sintered member of the present disclosure.

DETAILED DESCRIPTION

Figure 1:
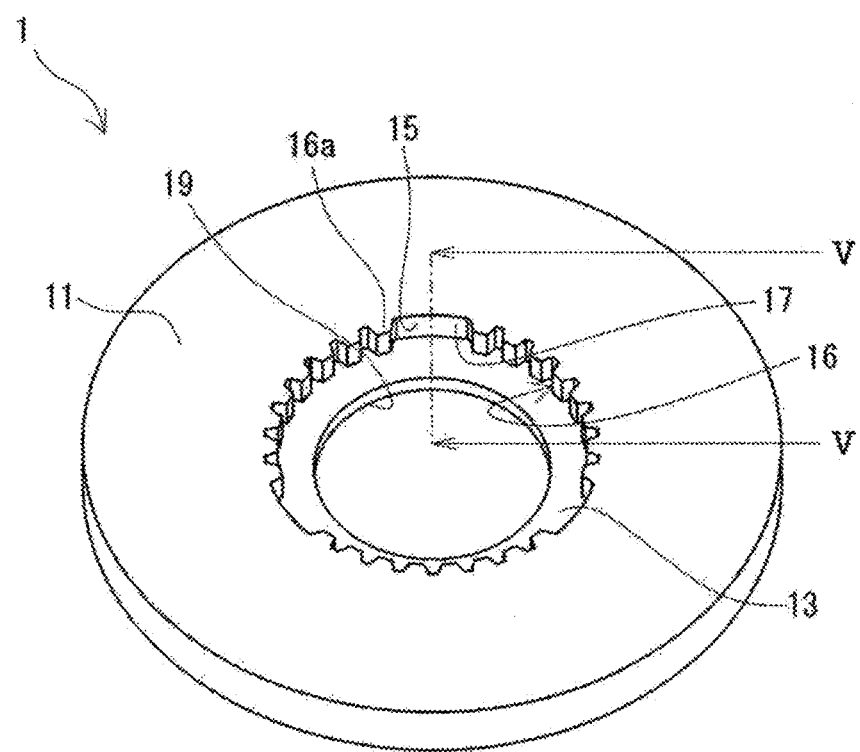
FIG. 1 is a perspective view showing a first face side of a sintered member according to Embodiments 1, 2.

Problems to be Solved by the Present Disclosure

The first cam included in the cam mechanism of the electromagnetic coupling may be composed of a sintered member. The first cam is mechanically involved with the second cam through the ball, and therefore is desired to have excellent fatigue strength. The first cam having excellent fatigue strength has a long life, which ensures long-term use of the electromagnetic coupling.

Therefore, one object of the present disclosure is to provide a sintered member capable of constituting an electromagnetic coupling usable over a long period of time.

Another object of the present disclosure is to provide an electromagnetic coupling usable over a long period of time.

Effects of the Present Disclosure

The sintered member according to the present disclosure can constitute an electromagnetic coupling usable over a long period of time.

The electromagnetic coupling according to the present disclosure is usable over a long period of time.

Description of Embodiments of the Present Disclosure

The first cam included in the conventional electromagnetic coupling is not provided with a tooth-missing part at a peripheral face thereof, and spline teeth are disposed also in a part, in the circumferential direction of the peripheral face, which overlaps a range in which each ball groove is formed. The present inventor has found that, if a load or the like, which is caused in the axial direction of the sintered member of the first cam by the second cam of the electromagnetic coupling, acts on the sintered member through the ball of the electromagnetic coupling, stress may be concentrated on the roots of the spline teeth. The present disclosure is based on the above findings. Firstly, embodiments of the present disclosure are listed and described.

A sintered member according to an aspect of the present disclosure is a sintered member having an annular shape. The sintered member includes a first face facing one side in an axial direction; a second face facing the other side in the axial direction; an inner peripheral face connected to an inner peripheral edge of the first face; and a plurality of tooth groups and a plurality of tooth-missing parts which are alternately disposed along a circumferential direction of the inner peripheral face. In the sintered member, the second face includes a plurality of ball grooves arranged in parallel in the circumferential direction. In the sintered member, each tooth group includes a plurality of spline teeth that are continuous in the circumferential direction of the peripheral face. In the sintered member, the number of the plurality of tooth-missing parts is the same as the number of the plurality of ball grooves. In the sintered member, positions in a radial direction in which the plurality of tooth-missing parts are formed are within ranges in the radial direction in which the plurality of ball grooves are formed. In the sintered member, ranges in the circumferential direction in which the plurality of tooth-missing parts are formed overlap ranges in the circumferential direction in which the plurality of ball grooves are formed.

The sintered member can constitute an electromagnetic coupling usable over a long period of time. The reason is as follows. That is, in the sintered member, the ranges in the circumferential direction in which the plurality of tooth-missing parts are formed overlap the ranges in the circumferential direction in which the plurality of ball grooves are formed. Therefore, spline teeth are absent in the part, in the circumferential direction of the inner peripheral face, which overlaps the range in which each ball groove is formed. That is, the part, in the circumferential direction of the inner peripheral face, which overlaps the range in which each ball groove is formed is rounded at a bending radius larger than that of the roots of the spline teeth. Therefore, when a first cam of an electromagnetic coupling is composed of the sintered member, even if a load or the like, which is caused in the axial direction of the sintered member by a second cam of the electromagnetic coupling, acts on the sintered member through a ball of the electromagnetic coupling, stress concentration is reduced by the rounded tooth-missing part, whereby stress concentration on the roots of the spline teeth is inhibited. Therefore, the sintered member can inhibit reduction in fatigue strength, and has a long life.

(2) As one exemplary form of the above sintered member, a variation width of Vickers hardness up to a depth of 5.0 mm along a direction orthogonal to a surface of the sintered member may be not larger than 100 HV.

The sintered member has uniform hardness up to 5.0 mm, in the direction orthogonal to the surface of the sintered member, which is the predetermined depth from the surface. A sintered member having non-uniform hardness is easy to be damaged because portions of lesser hardness can be mechanical weak points. Meanwhile, the sintered member having uniform hardness is hardly damaged because it has smaller number of portions to be mechanical weak points.

(3) As one exemplary form of the above sintered member, the sintered member may have a composition containing Ni, Cr, Mo, and C, and a balance of Fe and inevitable impurities, and
when a total content of elements contained in the sintered member is 100 mass %, a content of Ni in the sintered member may be larger than 2 mass % and not larger than 6 mass %.

The sintered member has both high hardness and high toughness. This is because the content of Ni is large but is not excessively large.

(4) As one exemplary form of the above sintered member, the content of Cr may be not less than 2 mass % and not larger than 4 mass %,
the content of Mo may be not less than 0.2 mass % and not larger than 0.9 mass %, and
the content of C may be not less than 0.2 mass % and not larger than 1.0 mass %.

The sintered member has high hardness. This is because the contents of the elements described above satisfy the respective ranges, which will be described later in detail.

(5) As one exemplary form of the above sintered member, the sintered member may have a multiphase structure including a martensitic phase and a retained austenite phase, and
an area ratio of the retained austenite phase at an arbitrary cross section of the sintered member may be not lower than 5%.

The sintered member has both high hardness and high toughness. This is because the sintered member includes the martensitic phase having high hardness and the retained austenite phase having high toughness. In particular, the sintered member is excellent in toughness. This is because the area ratio of the retained austenite phase having high toughness is high.

(6) An electromagnetic coupling according to an aspect of the present disclosure is an electromagnetic coupling including a first cam, a second cam, and a ball interposed between the first cam and the second cam, and
the first cam is composed of the sintered member according to any one of the above (1) to (5).

The electromagnetic coupling is usable over a long period of time. This is because the first cam is composed of the sintered member which can reduce concentration of stress on the roots of the spline teeth and has a long life, as described above.

Details of Embodiments of the Present Disclosure

Hereinafter, embodiments of the present disclosure will be described in detail. In the drawings, the same reference characters denote the same elements.

Embodiment 1

[Sintered Member]
With reference to FIG. 1 through FIG. 5, a sintered member 1 according to Embodiment 1 will be described. The sintered member 1 is formed in an annular shape (FIG. 1). The sintered member 1 has a first face 11 (FIG. 1), a second face 12 (FIG. 2), and a peripheral face 15 (FIG. 1). The first face 11 and the second face 12 face opposite sides from each other in the axial direction of the sintered member 1. The peripheral face 15 is an annular face connected to an inner peripheral edge of the first face 11. The sintered member 1 of the present embodiment has one feature of satisfying the following requirements (a) and (b).

(a) The sintered member 1 has tooth groups 16 and tooth-missing parts 17 (FIG. 1) alternately disposed along the circumferential direction of the peripheral face 15, and a plurality of ball grooves 12*a* (FIG. 2) disposed in parallel along the circumferential direction of the second face 12.

(b) The tooth-missing parts 17 and the ball grooves 12*a* satisfy a specific numerical relationship and a specific positional relationship.

Hereinafter, the respective components will be described in detail.

[Appearance]

The sintered member 1 has a disk shape (FIG. 1). The sintered member 1 has a hole 19 at the center thereof. The hole 19 penetrates the sintered member 1 along the axial direction of the sintered member 1. In addition to the hole 19, the sintered member 1 may have a plurality of through-holes (not shown) penetrating the first face 11 and the second face 12. These through holes can realize a reduction in weight of the sintered member.

[First Face and Second Face]

Figure 2:
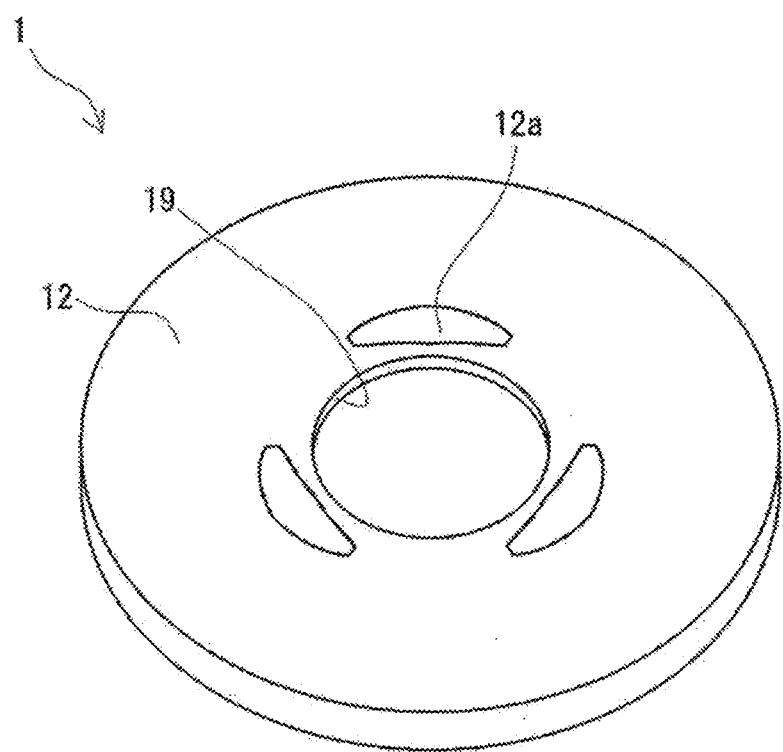
FIG. 2 is a perspective view showing a second face side of the sintered member according to Embodiments 1, 2.

The first face 11 is disposed at one side in the axial direction of the sintered member 1 (FIG. 1). The second face 12 is disposed at the other side in the axial direction of the sintered member 1 (FIG. 2). That is, the first face 11 and the second face 12 are disposed at opposite sides from each other in the axial direction of the sintered member 1. Each of the first face 11 and the second face 12 has an annular shape. Each of the first face 11 and the second face 12 is substantially formed as a flat plane. The first face 11 and the second face 12 are substantially orthogonal to the axial direction of the sintered member 1 and are parallel to each other.

[Peripheral Face]

The peripheral face 15 is parallel to the axial direction of the sintered member 1 (FIG. 1). In the present embodiment, the peripheral face 15 is an inner peripheral face. That is, a peripheral edge, of the peripheral face 15, at one side in the axial direction of the sintered member 1 is connected to the inner peripheral edge of the first face 11. Meanwhile, in the present embodiment, a peripheral edge, of the peripheral face 15, at the other side in the axial direction of the sintered member 1 is not connected to an inner peripheral edge of the second face 12 but is connected to an outer peripheral edge of a third face 13 described later. When the peripheral face 15 is an inner peripheral face as in the present embodiment, the peripheral edge at the other side of the peripheral face 15 may be connected to the inner peripheral edge of the second face 12. The peripheral face 15 may be an outer peripheral face. When the peripheral face 15 is the outer peripheral face, a peripheral edge at the one side of the peripheral face 15 is connected to an outer peripheral edge of the first face 11. The peripheral edge at the other side of the peripheral face 15 may be connected to an outer peripheral edge of the second face 12.

[Others]

(Third Face)

The third face 13 is a face at the one side in the axial direction of the sintered member 1. The third face 13 forms a step between itself and the first face 11, and the step has a length along the axial direction of the peripheral face 15. The third face 13 has an annular shape. Like the first face 11, the third face 13 is substantially formed as a flat plane. The third face 13 is substantially parallel to the first face 11 and the second face 12.

[Tooth Group]

Each of tooth groups 16 is a part to be meshed with teeth of a mating gear, and is an aggregation of a plurality of spline teeth 16*a* arranged in parallel along the circumferential direction of the peripheral face 15 (FIG. 1). Illustration of the mating gear is omitted. Since the peripheral face 15 of the present embodiment is an inner peripheral face as described above, the tooth group 16 is an inner tooth group. If the peripheral face 15 is an outer peripheral face, the tooth group 16 is an outer tooth group. One tooth group 16 is disposed between two tooth-missing parts 17 adjacent in the circumferential direction. The number of the tooth groups 16 is the same as the number of the tooth-missing parts 17. In the present embodiment, the number of the tooth groups 16 is 3.

The number of the spline teeth 16*a* in each tooth group 16 is not particularly limited as long as it is not less than 2, and can be selected as appropriate. If the number of the spline teeth 16*a* in each tooth group 16 is large, the number of the spline teeth 16*a* to be meshed with the mating gear is likely to be large. Therefore, a load that acts on each spline tooth 16*a* due to meshing with the mating gear is easily reduced. If the number of the spline teeth 16*a* in each tooth group 16 is small, a length Lb of each tooth-missing part 17 described later is likely to be increased. Therefore, even when a first cam 110 (FIG. 6) of an electromagnetic coupling 10 is composed of the sintered member 1, stress concentration on the roots oldie spline teeth 16*a* is easily reduced, as described later in detail. In the present embodiment, the number of the spline teeth 16*a* in each tooth group 16 is 8.

Figure 3:
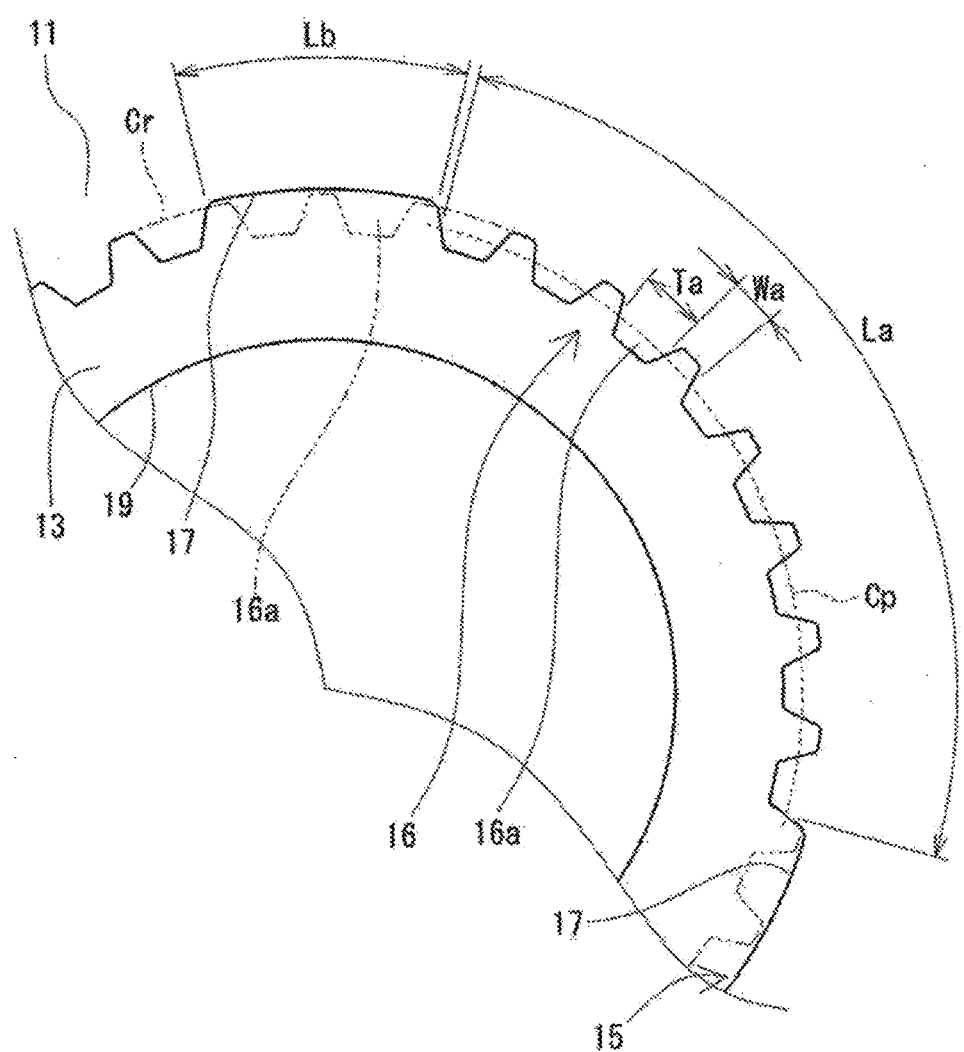
FIG. 3 is a plan view showing a part of the first face side of the sintered member according to Embodiments 1, 2.

A length La of each tooth group 16 can be selected as appropriate in accordance with the length Lb of the tooth-missing part 17 described later (FIG. 3). The length La of a tooth group 16 is a length from a spline tooth 16*a* at one end of the tooth group 16 to a spline tooth 16*a* at the other end of the tooth group 16 on a circumference of a pitch circle Cp of the spline teeth 16*a*. In FIG. 3, the pitch circle Cp is indicated by a broken line. The length La of each tooth group 16 may be different from or equal to the length Lb of the tooth-missing part 17 described later. When the length La of the tooth group 16 is larger than the length Lb of the tooth-missing part 17, the number of the spline teeth 16*a* in the tooth group 16 is easy to be increased. Therefore, stress that acts on each spline tooth 16*a* is easily reduced. When the length La of the tooth group 16 is smaller than the length Lb of the tooth-missing part 17, since the length Lb of the tooth-missing part 17 is large, stress concentration on the roots of the spline teeth 16*a* is easily reduced. When the length a of the tooth group 16 is equal to the length Lb of the tooth-missing part 17, both the effect of easily reducing stress that acts on each spline tooth 16*a* and the effect of easily reducing stress concentration on the roots of the spline teeth 16*a* can be achieved in good balance.

In each tooth group 16, a tooth thickness Ta of each spline tooth 16*a* and a width Wa of each tooth groove can be selected as appropriate in accordance with the width of each tooth groove and the thickness of each tooth of the mating gear. The tooth thickness Ta of the spline tooth 16*a* is the length of the spline tooth 16*a* on the circumference of the pitch circle Cp. The width Wa of the tooth groove is the length between adjacent spline teeth 16*a* on the circumference of the pitch circle Cp. In each tooth group 16, each spline tooth 16*a* has equal tooth thickness Ta. In each tooth group 16, the width Wa of the tooth groove is smaller than the length Lb of the tooth-missing part 17. In each tooth group 16, each tooth groove has equal width Wa.

[Tooth-Missing Part]

Each tooth-missing part 17 has no teeth and does not mesh with the teeth of the mating gear (FIG. 1). The tooth-missing part 17 is formed of a part of the peripheral face 15. One tooth-missing part 17 is disposed between two tooth groups 16 adjacent in the circumferential direction. That is, the number of the tooth-missing parts 17 is equal to the number of the ball grooves 12a described later. In the present embodiment, the number of the tooth-missing parts 17 is 3.

In each tooth-missing part 17, the number of missing spline teeth 16a varies depending on the tooth thickness Ta of the spline tooth 16a, the width Wa of the tooth groove, and the length Lb of the tooth-missing part 17 described later (FIG. 3). The number of the missing spline teeth 16a can be grasped by arranging spline teeth 16a of a tooth group 16 in parallel in the circumferential direction, instead of forming a tooth-missing part 17, as indicated by a dashed-and-double-dotted line in FIG. 3. At this time, the spline teeth 16a are made to have equal thickness Ta and the tooth grooves are made to have equal width Wa. In each tooth-missing part 17, the number of the missing spline teeth 16a may be at least two or more. In this case, the length Lb of the tooth-missing part 17 is likely to be long, and therefore, stress concentration on the roots of the spline teeth 16a is easily reduced. However, if the number of the missing spline teeth 16a is excessively large, the number of the spline teeth 16a is reduced, and stress that acts on each spline tooth 16a is easily increased. The number of the missing spline teeth 16a is preferably 3 or less, for example, although it depends on the tooth thickness Ta of the spline tooth 16a, the width Wa of the tooth groove, and the length Lb of the tooth-missing part 17. In the present embodiment, the number of the missing spline teeth 16a in the tooth-missing part 17 is 2. That is, one tooth-missing part 17 is formed by two spline teeth 16a being missed, and the two missing spline teeth 16a are counted as one tooth-missing part 17.

Figure 5:
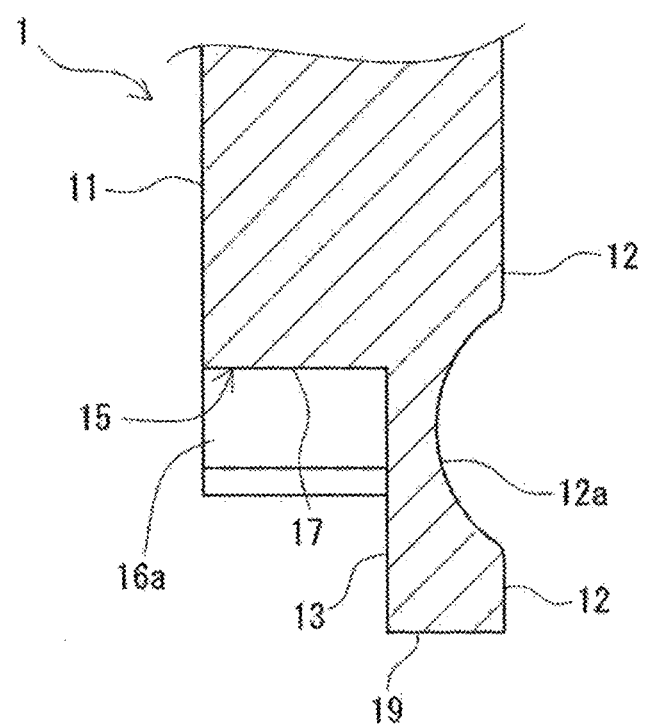
FIG. 5 is a cross-sectional view showing a part of the sintered member taken along a V-V cutting line in FIG. 1.

A part, of the peripheral face 15, in which each tooth-missing part 17 is formed opposes the corresponding ball groove 12a as described later (FIG. 5). That is, the position, in the radial direction, in which each tooth-missing part 17 is formed is within a range, in the radial direction, in which the corresponding ball groove 12a is formed, and a range, in the circumferential direction, in which each tooth-missing part 17 is formed and a range, in the circumferential direction, in which the corresponding ball groove 12a is formed, overlap each other in the circumferential direction.

The first cam 110 of an electromagnetic coupling 10 may be composed of a sintered member, different from the sintered member 1 of the present embodiment, in which tooth-missing parts 17 are not formed at the peripheral face 15 and spline teeth 16a are also formed in parts, in the circumferential direction of the peripheral face 15, which overlap the ranges in which the ball grooves 12a are formed. In this case, a load or the like, which is caused in the axial direction of the sintered member 1 by a second cam 120 of the electromagnetic coupling 10, acts on the sintered member 1 through a ball 130 of the electromagnetic coupling 10, and stress is concentrated on the roots of the spline teeth in the parts in the circumferential direction which overlap the ranges in which the ball grooves 12a are formed. Meanwhile, in the sintered member 1 of the present embodiment, since the range in the circumferential direction in which each tooth-missing part 17 is formed overlaps the range in the circumferential direction in which the corresponding ball groove 12a is formed, roots of spline teeth 16a, on which stress will be concentrated, are absent in the parts, in the circumferential direction of the peripheral face 15, which overlap the ranges in which the ball grooves 12a are formed. That is, the parts, in the circumferential direction of the peripheral face 15, which overlap the ranges in which the corresponding ball grooves 12a are formed are rounded at a bending radius larger than that of the roots of the spline teeth 16a. Therefore, stress concentration following the action of the load or the like is reduced by the rounded tooth-missing parts 17, thereby reducing stress concentration on the roots of the spline teeth 16a.

Figure 4:
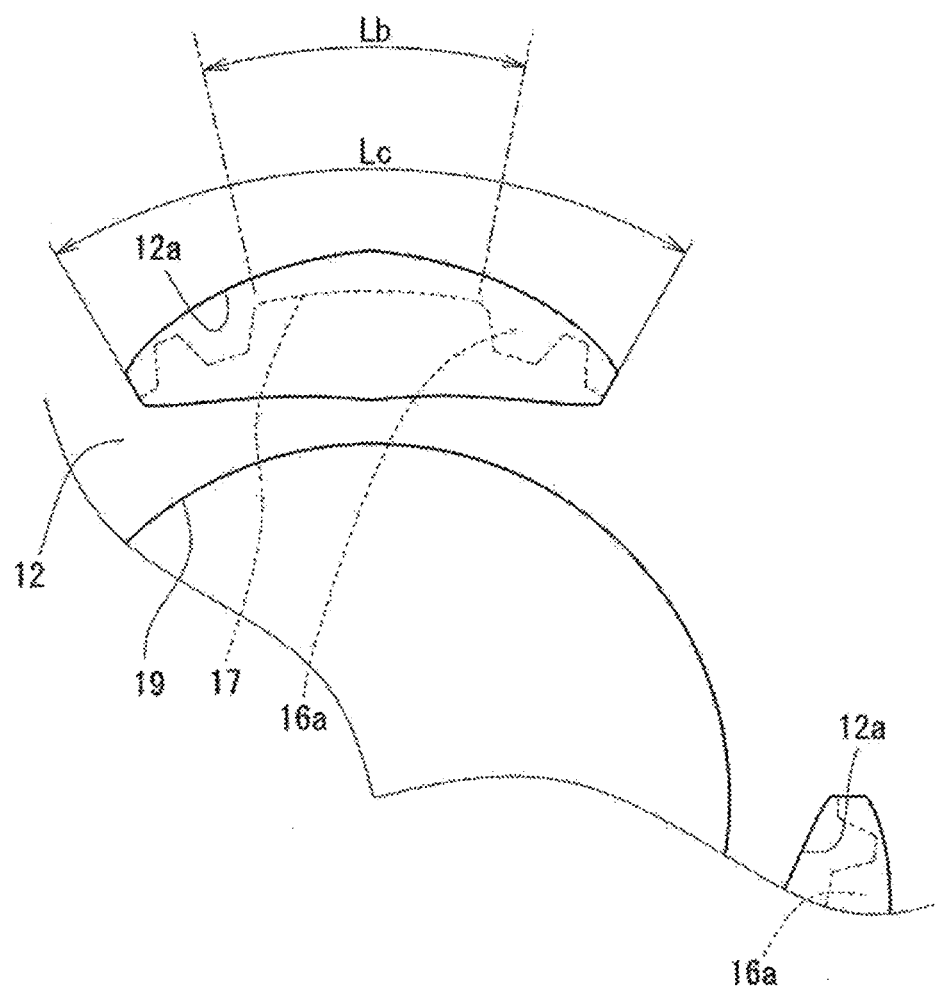
FIG. 4 is a plan view showing a part of the second face side of the sintered member according to Embodiments 1, 2.

The length Lb of each tooth-missing part 17 can be selected as appropriate in accordance with a length Lc of each ball groove 12a described later (FIG. 3). The length Lb of the tooth-missing part 17 is a length between adjacent tooth groups 16 on the circumference of a root circuit Cr. In FIG. 3, the root circle Cr is indicated by a dashed-and-dotted line. The length Lb of the tooth-missing part 17 is preferably not smaller than 30% and not larger than 70% with respect to the length Lc of the ball groove 12a described later. When the length Lb of the tooth-missing part 17 is not smaller than 30% with respect to the length Lc of the ball groove 12a, the tooth-missing part 17 has a sufficient length. Therefore, stress concentration on the roots of the spline teeth 16a is easily reduced. When the length Lb of the tooth-missing part 17 is not larger than 70% with respect to the length Lc of the ball groove 12a, the length of the tooth-missing part 17 is prevented from being excessively long. That is, the length La of the tooth group 16 is prevented from being excessively short. In the present embodiment, the length Lb of the tooth-missing part 17 is smaller than the length Lc of the ball groove 12a (FIG. 4). Each tooth-missing part 17 has equal length Lb. Each tooth-missing part 17 is formed such that the entire length Lb thereof is within a range that overlaps the range in which the corresponding ball groove 12a is formed (FIG. 4). That is, a spline tooth 16a at each end of the tooth group 16 is located at a position that overlaps an end part of the range in which the ball groove 12a is formed.

In FIG. 4, the tooth-missing part 17 opposing the ball groove 12a and the spline tooth 16a at each end of the tooth group 16 are indicated by a broken line.

The length Lb of the tooth-missing part 17 indicates the formation range in the circumferential direction of the tooth-missing part 17, and the length Lc of the ball groove 12a indicates the formation range in the circumferential direction of the ball groove 12a (FIG. 4).

That is, as shown in FIG. 4, the formation range (length Lb) in the circumferential direction of the tooth-missing part 17 and the formation range (length Lc) in the circumferential direction of the ball groove 12a, overlap each other.

In FIG. 4, the center of the range of the length Lb of the tooth-missing part 17 and the center of the range of the length Lc of the ball groove 12a are substantially aligned with each other. However, the center of the range of the length Lb of the tooth-missing part 17 and the center of the range of the length Lc of the ball groove 12a may be shifted from each other.

In FIG. 4, the entire range of the length Lb of the tooth-missing part 17 is included in the range of the length Lc of the ball groove 12a, and the entire range of the length Lb of the tooth-missing part 17 overlaps the range of the length Lc of the ball groove 12a. However, a part of the range of the length Lb of the tooth-missing part 17 may overlap the range of the length Lc of the ball groove 12a.

The length Lb of the tooth-missing part 17 may be larger than the length Lc of the ball groove 12a as long as a part or the entirety of the length Lb of the tooth-missing part 17 overlaps a part or the entirety of the length Lc of the ball groove 12a.

In the present embodiment, the position, in the radial direction, of the tooth-missing part 17 at the outer peripheral edge is shifted toward the outer peripheral edge side of the ball groove 12a when the tooth-missing part 17 is viewed in a plan. The position of the tooth-missing part 17 at the outer peripheral edge may be shifted toward the inner peripheral edge side of the ball groove 12a. The outer peripheral edge of the tooth-missing part 17 may be disposed right in the middle between the outer peripheral edge and the inner peripheral edge of the ball groove 12a. It is considered that, when the position of the tooth-missing part 17 at the outer peripheral edge is shifted toward the inner peripheral edge side of the ball groove 12a, stress concentration following the action of the load or the like is easily reduced in the tooth-missing part 17, and stress concentration on the roots of the spline teeth 16a is easily reduced.

As described above, the position in the radial direction at which each tooth-missing part 17 is formed is within the range in the radial direction in which the corresponding ball groove 12a is formed.

[Ball Groove]

In each ball groove 12a, a ball 130 (FIG. 6) which is a component of the electromagnetic coupling 10 is disposed (FIG. 2). The ball grooves 12a are arranged in parallel along the circumferential direction of the second face 12. As for the ball grooves 12a adjacent in the circumferential direction, the ball grooves 12a may be formed at intervals in the circumferential direction as in the present embodiment or may be successively formed in the circumferential direction substantially without intervals, although it depends on the number of the ball grooves 12a and the length Lc of each ball groove 12a. Being successively formed in the circumferential direction substantially without intervals means, for example, being successively formed such that the ball grooves 12a adjacent in the circumferential direction are connected via the end portions thereof. In the present embodiment, the second face 12 is interposed between the ball grooves 12a adjacent in the circumferential direction. The circumferential intervals of the ball grooves 12a adjacent in the circumferential direction are equal intervals.

The number of the ball grooves 12a is not particularly limited as long as it is not smaller than 2, and can be appropriately selected. The number of the ball grooves 12a is 3 to 9, for example. In the present embodiment, the number of the ball grooves 12a is 3.

The length Lc of the ball groove 12a can be selected as appropriate in accordance with the number of the ball grooves 12a, the interval between the ball grooves 12a adjacent in the circumferential direction, and the like. The length Lc of the ball groove 12a is the maximum length along the circumferential direction as shown in FIG. 5. In the present embodiment, the length Lc of the ball groove 12a is larger than the length Lb of the tooth-missing part 17 described above.

The shape of each ball groove 12a is not particularly limited and can be selected as appropriate. The depths of the ball grooves 12a are not uniform and are different from each other. When the first cam 110 (FIG. 6) of the electromagnetic coupling 10 is composed of the sintered member 1, the different depths allow the interval between the first cam 110 and the second cam 120 opposing through the ball 130 to be reduced and increased, which will be described later in detail. The widths of openings of the ball grooves 12a may be uniform or different from each other (FIG. 2). The depth and the opening width of each ball groove 12a may satisfy the following relationships. That is, the opening width at the deepest part of the ball groove 12a is broadest. The opening width at the shallowest part of the ball groove 12a may be equal to the opening width at the deepest part, or may be narrowest.

In the present embodiment, each ball groove 12a has an arc shape (FIG. 2, FIG. 4). In the present embodiment, the ball groove 12a is sloped such that the depth thereof is gradually reduced from the center toward the both ends in the circumferential direction. That is, the depth of the ball groove 12a is largest at the center in the circumferential direction and is smallest at the both ends in the circumferential direction. The opening width of the ball groove 12a is gradually reduced from the center toward the both ends in the circumferential direction. That is, the opening width of the ball groove 12a is largest at the center in the circumferential direction and is smallest at the both ends in the circumferential direction.

Depending on the shape of the ball groove 12a, the ball groove 12a may be sloped such that the depth thereof is reduced from one end toward the other end in the circumferential direction. In this case, the opening width of the ball groove 12a may be reduced from the one end toward the other end in the circumferential direction. The opening width of the ball groove 12a may be uniform in the circumferential direction.

[Composition]

The sintered member 1 is formed of a plurality of iron-based particles being bonded to each other. The "iron-based" means pure iron or iron-based alloys. For example, an iron-based alloy contains: one or more types of additive elements selected from the group consisting of Cu (copper), C (carbon), Ni (nickel), Mo (molybdenum), Mn (manganese), and Cr (chromium); and a balance of Fe (iron) and impurities. Specific examples of the iron-based alloy include stainless steel, Fe—C-based alloy, Fe—Cu—Ni—Mo-based alloy, Fe—Ni—Mo—Mn-based alloy, Fe—Cu-based alloy, Fe—Cu—C-based alloy, Fe—Cu—Mo-based alloy, Fe—Ni—Mo—Cu—C-based alloy, Fe—Ni—Cu-based alloy, Fe—Ni—Mo—C-based alloy, Fe—Ni—Cr-based alloy, Fe—Ni—Mo—Cr-based alloy, Fe—Ni—Cr—Mo—C-based alloy, Fe—Cr-based alloy, Fe—Mo—Cr-based alloy, Fe—Cr—C-based alloy, Fe—Ni—C-based alloy, and Fe—Mo—Mn—Cr—C-based alloy. Among these iron-based alloys, a specific Fe—Ni—Cr—Mo—C-based alloy is preferable. A sintered member 1 formed of the specific Fe—Ni—Cr—Mo—C-based alloy will be described later for Embodiment 2.

The composition of the sintered member 1 can be confirmed through component analysis using an inductively coupled plasma optical emission spectrometry (ICP-OES).

[Manufacturing Method]

The sintered member 1 of the present embodiment can be manufactured by a manufacturing method including a process of preparing a powder compacted body, and a process of sintering the powder compacted body. Hereinafter, these processes are described in order.

[Preparation Process]

This process prepares a powder compacted body having a plurality of teeth groups, a plurality of tooth-missing parts, and a plurality of ball grooves. The plurality of teeth groups, the plurality of tooth-missing parts, and the plurality of ball grooves included in the powder compacted body correspond to the plurality of tooth groups 16, the plurality of tooth-missing parts 17, and the plurality of ball grooves 12a included in the sintered member 1 described above. The sintered member 1 is manufactured by sintering the powder compacted body prepared in this process. That is, the powder compacted body corresponds to the member 1 which has not yet been sintered. The powder compacted body is obtained through pressure molding of prepared material powder. The material powder can be selected as appropriate so as to satisfy the aforementioned composition of the sintered member 1. For the pressure molding of the material powder, a mold capable of performing "near net shape" is used, for example. The near net shape is a technique of finishing an item in a shape very close to its final (net) shape. Through this pressure molding, the powder compacted body including the plurality of teeth groups, the plurality of tooth-missing parts, and the plurality of ball grooves is obtained. The powder compacted body can also be prepared by manufacturing a disk-like powder compacted body, and forming a plurality of teeth groups, a plurality of tooth-missing parts, and a plurality of ball grooves in the powder compacted body through cutting work.

[Sintering Process]

This process sinters the powder compacted body. The aforementioned sintered member 1 in which the particles of the material powder are bonded can be obtained by sintering the powder compacted body. An appropriate sintering furnace can be used for sintering of the powder compacted body. If rapid cooling is required at a cooling step in the sintering process, a continuous sintering furnace is preferred for sintering of the powder compacted body. The continuous sintering furnace includes a sintering furnace, and a rapid cooling chamber connected downstream of the sintering furnace.

Sintering conditions can be selected as appropriate in accordance with the composition of the material powder. A sintering temperature is, for example, not lower than 1050° C. and not higher than 1400° C., and furthermore, not lower than 1100° C. and not higher than 1300° C. A sintering time is, for example, not shorter than 10 minutes and not longer than 150 minutes, and furthermore, not shorter than 15 minutes and not longer than 60 minutes. As the sintering conditions, known conditions are applicable.

A cooling rate at the cooling step in the sintering process can be selected as appropriate. The sintered member 1 may be rapidly cooled by increasing the cooling rate, or may be slowly cooled without increasing the cooling rate. Rapid cooling can dispense with a process of heat treatment described later. If rapid cooling is not performed, the process of heat treatment described later may be performed.

In the case of rapid cooling, the cooling rate may be not lower than 1° C./sec. When the cooling rate is not lower than 1° C./sec, the sintered member 1 is rapidly cooled. This allows a martensitic phase to be easily formed, whereby the sintered member 1 having high hardness can be manufactured. Moreover, rapid cooling allows the sintered member 1, in which a variation width of Vickers hardness from the surface to a predetermined depth is small, to be easily manufactured. Specifically, the sintered member 1 in which the variation width of Vickers hardness is 50 HV or smaller is manufactured. The cooling rate is more preferably not lower than 2° C./sec, and particularly preferably not lower than 5° C./sec. For example, an upper limit of the cooling rate is 1000° C./sec, furthermore, 500° C./sec, and, particularly, 200° C./sec. As for a cooling method, spraying a cooling gas to the sintered member 1 may be adopted. As for the type of the cooling gas, an inactive gas such as nitrogen gas or argon gas may be adopted.

[Other Processes]

In addition to the above processes, the sintered member manufacturing method may include at least one of a process of heat treatment and a process of finishing treatment.

(Process of Heat Treatment)

Examples of heat treatment include quenching treatment, tempering treatment, and the like. The quenching treatment and the tempering treatment improve mechanical characteristics, in particular, hardness and strength, of the sintered member 1. The quenching treatment may be carburizing quenching treatment. Known conditions are applicable to the quenching treatment (carburizing quenching treatment) and the tempering treatment.

(Process of Finishing Treatment)

This process adjusts the dimensions of the sintered member 1 to design dimensions. Examples of finishing treatment include sizing, polishing of the surface of the sintered member 1, and the like. In particular, polishing can easily reduce the surface roughness of the sintered member 1.

[Applications]

Figure 6:
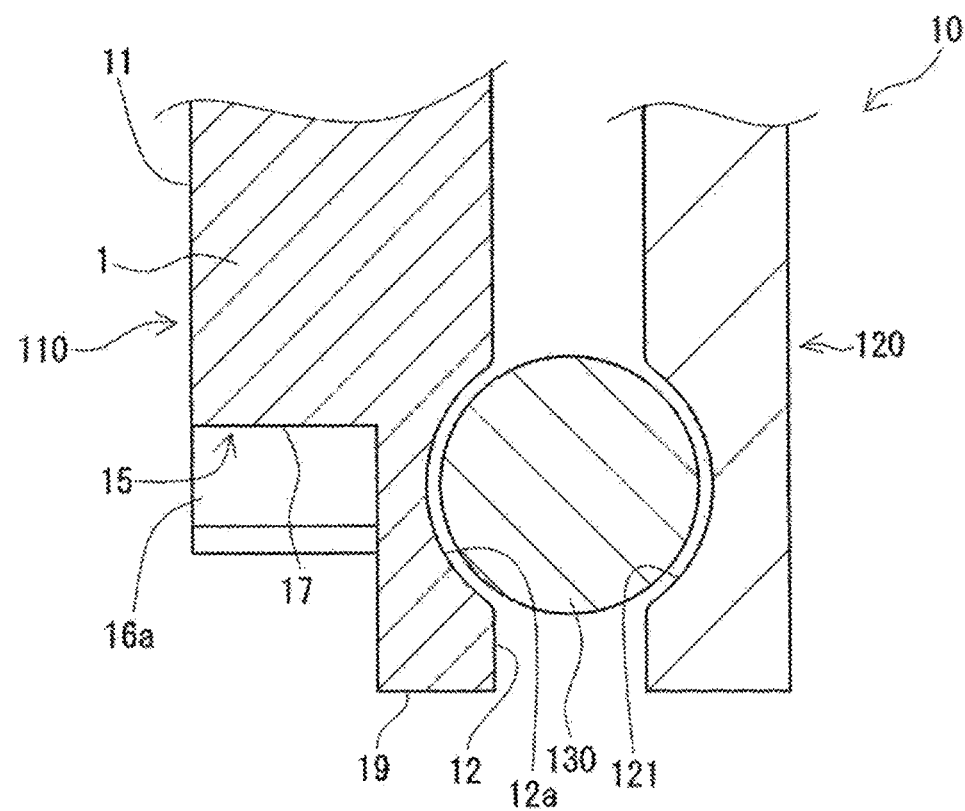
FIG. 6 is a cross-sectional view showing an electromagnetic coupling according to Embodiment 1.

The sintered member 1 according to the present embodiment can be preferably used as a cam component constituting a cam mechanism of an electromagnetic coupling, for example. With reference to FIG. 6, an example of an electromagnetic coupling according to the present embodiment will be described. The electromagnetic coupling 10 performs connection and disconnection of a propeller shaft and a rear differential gear of an automobile, for example.

The electromagnetic coupling 10 is provided with a cam mechanism including a first cam 110, a second cam 120, and a ball 130. FIG. 6 shows only the cam mechanism, for convenience of description. In addition to these components, the electromagnetic coupling 10 includes an electromagnetic coil, an armature, a first clutch, a second clutch, etc., which are not shown in FIG. 6. FIG. 6 is a cross-sectional view showing a state where the cam mechanism is cut at the same position as in the cross-sectional view shown in FIG. 5.

The first cam 110 is composed of the aforementioned sintered member 1. That is, the first cam 110 includes a plurality of tooth groups 16 and a plurality of tooth-missing parts 17. A second face 12 includes a plurality of ball grooves 12a. A first face 11 of the first cam 110 is located at a side opposite to the second cam 120 side, and the second face 12 of the first cam 110 is located at the second cam 120 side. The second cam 120 includes a ball groove 121 in which the ball 130 is disposed. The ball 130 is interposed between the ball groove 12a of the first cam 110 and the ball groove 121 of the second cam 120.

The distance between the first cam 110 and the second cam 120 is increased (not shown) and reduced as shown in FIG. 6, depending on presence/absence of current application to the electromagnetic coil.

When a current is applied to the electromagnetic coil, the second cam 120 rotates through the armature, the second clutch, and the like. The ball 130 moves from the deepest part to the shallowest part of the ball groove 12a of the first cam 110 while being dragged by the ball groove 121 of the second cam 120. This movement of the ball 130 causes the first cam 110 to be pushed toward the first face 11 side through the ball 130. Then, the first cam 110 moves apart from the second cam 120, and the distance between the first cam 110 and the second cam 120 is increased. When the distance is increased, the propeller shaft and the rear differential gear are connected to each other through the first clutch and the like.

Meanwhile, when the current applied to the electromagnetic coil is shut off, rotation of the second cam 120 during current application is canceled. The second cam 120 rotates in a direction opposite to the direction during current application. Then, the ball 130 moves from the shallowest part to the deepest part of the ball groove 12a of the first cam 110 while being dragged by the ball groove 121 of the second cam 120. This movement of the ball 130 cancels the pressing force toward the first face 11 of the first cam 110 through the ball 130. The first cam 110 approaches the second cam 120 side, and the distance between the first cam 110 and the second cam 120 is reduced. When the distance is reduced, connection of the propeller shaft and the rear differential gear through the first clutch and the like is disconnected.

Advantageous Effects

The sintered member 1 according to the present embodiment can constitute the electromagnetic coupling 10 usable over a long period of time. In the sintered member 1 of the present embodiment, since the range in the circumferential direction in which each tooth-missing part 17 is formed overlaps the range in the circumferential direction in which the corresponding ball groove 12a is formed, roots of spline teeth 16a, on which stress will be concentrated, are absent in the parts, in the circumferential direction of the peripheral face 15, which overlap the ranges in which the ball grooves 12a are formed. That is, the parts, in the circumferential direction of the peripheral face 15, which overlap the ranges in which the corresponding ball grooves 12a are formed are rounded at a bending radius larger than that of the roots of the spline teeth 16a. Therefore, in the case where the first cam 110 of the electromagnetic coupling 10 is composed of the sintered member 1 of the present embodiment, if a load or like, which is caused in the axial direction of the sintered member 1 by the second cam 120 of the electromagnetic coupling 10, acts on the sintered member 1 through the ball 130 of the electromagnetic coupling 10, stress concentration is reduced by the rounded tooth-missing parts 17, thereby inhibiting stress concentration on the roots of the spline teeth 16a. Therefore, the sintered member 1 of the present embodiment can inhibit reduction in fatigue strength, and has a long life. Meanwhile, the electromagnetic coupling 10 of the present embodiment is usable over a long period of time because the first cam 110 is composed of the sintered member 1 which can reduce stress concentration on the roots of the spline teeth 16a and therefore has a long life.

Embodiment 2

[Sintered Member]

With reference to FIG. 1 to FIG. 5, FIG. 7, FIG. 8A, FIG. 8B, FIG. 9A, and FIG. 9B, a sintered member 1 according to Embodiment 2 will be described. The sintered member 1 of Embodiment 2 is different from the sintered member 1 of Embodiment 1 mainly in that it has specific composition, structure, and characteristics. The sintered member 1 of Embodiment 2 has the same appearance as the sintered member 1 of Embodiment 1. The following description will be focused mainly on the difference from Embodiment 1. Description of the same components as those in Embodiment 1 will be omitted.

[Composition]

The sintered member 1 has a composition containing Ni, Cr Mo, C, and the balance of Fe and inevitable impurities.

(Ni)

Ni increases toughness of the sintered member 1. Ni can improve hardenability during the process of manufacturing the sintered member 1, and therefore also contributes to an increase in hardness of the sintered member 1. Hereinafter, the process of manufacturing the sintered member 1 is sometimes referred to simply as "manufacturing process". The content of Ni is preferably larger than 2 mass % and not larger than 6 mass %. When the content of Ni is larger than 2 mass %, the sintered member 1 has excellent toughness. This is because the content of Ni is large. Since the content of Ni is large, part of Ni is alloyed with Fe while the remaining Ni is not alloyed but remains as pure Ni. The pure Ni contributes to improvement of toughness. When the content of Ni is not larger than 6 mass %, the sintered member 1 has excellent hardness. Because the content of Ni is not excessively large, reduction in hardness can be inhibited. Therefore, when the content of Ni satisfies the above range, the sintered member 1 has both high hardness and high toughness. The content of Ni is more preferably not less than 2.5 mass % and not larger than 5.5 mass %, and particularly preferably not less than 3 mass %, and not larger than 5 mass %. The content of Ni is the amount of Ni contained in the sintered member 1 when the total amount of the elements contained in the sintered member 1 is 100 mass %. The same applies to Cr, Mo, and C described below.

(Cr)

Cr increases hardness of the sintered member 1. This is because Cr can increase hardenability during the manufacturing process. The content of Cr is preferably not less than 2 mass % and not larger than 4 mass %, for example. When the content of Cr is not less than 2 mass %, the sintered member 1 has excellent hardness. When the content of Cr is not larger than 4 mass %, reduction in toughness of the sintered member 1 can be inhibited. The content of Cr is more preferably not less than 2.2 mass % and not larger than 3.8 mass %, and particularly preferably not less than 2.5 mass % and not larger than 3.5 mass %.

(Mo)

Mo increases hardness of the sintered member 1. This is because Mo can increase hardenability during the manufacturing process. The content of Mo is preferably not less than 0.2 mass % and not larger than 0.9 mass %, for example. When the content of Mo is not less than 0.2 mass %, the sintered member 1 has excellent hardness. When the content of Mo is not larger than 0.9 mass %, reduction in toughness of the sintered member 1 can be inhibited. The content of Mo is more preferably not less than 0.3 mass % and not larger than 0.8 mass %, and particularly preferably not less than 0.4 mass % and not larger than 0.7 mass %.

(C)

C increases hardness of the sintered member 1. C easily causes an Fe—C liquid phase to appear during the manufacturing process. The Fe—C liquid phase easily rounds off edges of voids. Therefore, the sintered member 1 has less acute-angle edges of voids that will cause reduction in hardness. Therefore, hardness of the sintered member 1 is easily increased. The content of C is preferably not less than 0.2 mass % and not larger than 1.0 mass %, for example. When the content of C is not less than 0.2 mass %, the sintered member 1 has high hardness. This is because the Fe—C liquid phase is sufficiently generated during the manufacturing process, and effectively rounds off the edges of the voids. When the content of C is not larger than 1.0 mass %, the sintered member 1 has excellent dimensional accuracy. This is because the Fe—C liquid phase is easily prevented from being excessively generated during the manufacturing process. The content of C is more preferably not less than 0.3 mass % and not larger than 0.95 mass %, and particularly preferably not less than 0.4 mass % and not larger than 0.9 mass %.

[Structure]

As for the structure of the sintered member 1, a multi-phase structure including a martensitic phase and a retained austenite phase is preferable (FIG. 8A, FIG. 8B, FIG. 9A, FIG. 9B). Each of FIG. 8A, FIG. 8B, FIG. 9A, and FIG. 9B is a micrograph of a cross section of the sintered member 1, as described later in detail. In each micrograph, a white part indicated ahead of each arrow is the retained austenite phase, and a part surrounding the retained austenite phase is the martensitic phase. The martensitic phase causes the sintered member 1 to have high hardness. The retained austenite phase causes the sintered member 1 to have high toughness.

The area ratio of the retained austenite phase is preferably not lower than 5%, for example. In this case, since the area ratio of the retained austenite phase having high toughness is high, the sintered member 1 has excellent toughness. The area ratio of the retained austenite phase is preferably not higher than 50%, for example. In this case, the area ratio of the retained austenite phase is not excessively high. That is, the area ratio of the martensitic phase is more likely to be high. Therefore, the sintered member 1 has high hardness and high toughness. The area ratio of the retained austenite phase is more preferably not lower than 10% and not higher than 45%, and particularly preferably not lower than 15% and not higher than 40%. The area ratio of the retained austenite phase is a ratio of the total area of the retained austenite phase with respect to the whole area of the micrograph at the cross section of the sintered member 1, which will be described later in detail.

[Characteristics]
(Hardness)

The sintered member 1 preferably has high hardness. The sintered member 1 preferably has high Vickers hardness, and a small variation width of the Vickers hardness (circles shown in the graph of FIG. 7). The graph of FIG. 7 will be described later in detail. The Vickers hardness of the sintered member 1 is preferably not lower than 615 HV. The variation width of the Vickers hardness of the sintered member 1 is preferably not larger than 100 HV. This sintered member 1 has high and uniform hardness from the surface to the predetermined depth. That is, this sintered member 1 has less parts to be mechanical weak points as compared to a sintered member having uneven hardness, and therefore is hardly damaged. The sintered member 1, having the small variation width of the Vickers hardness, is obtained through sinter hardening which is a process of rapidly cooling the sintered member 1 at the cooling step in the sintering process. Since the sintered member 1 has been subjected to sinter hardening, it need not be subjected to quenching and tempering after sintering. The variation width of the Vickers hardness of a sintered member 1 which has not been subjected to sinter hardening but has been subjected to quenching and tempering after sintering, exceeds 100 HV, for example.

The Vickers hardness of the sintered member 1 is more preferably not lower than 620 HV, and particularly preferably not lower than 625 HV. The variation width of the Vickers hardness is more preferably not larger than 75 HV, and particularly preferably not larger than 50 HV. The Vickers hardness of the sintered member 1 is an average of Vickers hardness values measured at a plurality of points in the range from the surface of the sintered member 1 to the predetermined depth at the cross section of the sintered member 1, as described later in detail. The variation width of the Vickers hardness of the sintered member 1 is a difference between the maximum value and the minimum value of the Vickers hardness values measured in the range from the surface to the predetermined depth at the cross section of the sintered member 1.

(Toughness)

The sintered member 1 preferably has high toughness. Specifically, the sintered member 1 preferably has a large stress amplitude that bears $10^7$ times of bending repeated in an Ono-type rotating bending fatigue test described later in detail, and preferably has excellent bending fatigue strength. The stress amplitude that bears $10^7$ times of bending is preferably not smaller than 420 MPa. The stress amplitude that bears $10^7$ times of bending is more preferably not smaller than 423 MPa, and particularly preferably not smaller than 425 MPa.

[Sintered Member Manufacturing Method]

The sintered member 1 of the present embodiment can be manufactured by a sintered member manufacturing method including a process of preparing a powder compacted body and a process of sintering the powder compacted body, similar to the aforementioned sintered member manufacturing method. This preparation process is identical to the aforementioned preparation process in that a powder compacted body including a plurality of tooth groups, a plurality of tooth-missing parts, and a plurality of ball grooves is prepared. This preparation process is different from the aforementioned preparation process in that the powder compacted body includes, as material powders, iron-based alloy powder, Ni powder, and C powder. In the sintering process, rapid cooling is performed at the cooling step.

[Preparation Process]
(Iron-Based Alloy Powder)

The iron-based alloy powder has a composition containing Cr, Mo, and the balance of Fe and inevitable impurities. The contents of Cr and Mo in the iron-based alloy are maintained even after the sintering process described later. That is, the contents of Cr and Mo in the iron-based alloy are maintained in the aforementioned sintered member 1. The content of Cr in the iron-based alloy is, for example, preferably not less than 2 mass % and not larger than 4 mass %, more preferably not less than 2.2 mass % and not larger than 3.8 mass %, and particularly preferably not less than 2.5 mass % and not larger than 3.5 mass %, as described above. The content of Mo in the iron-based alloy is, for example, preferably not less than 0.2 mass % and not larger than 0.9 mass %, more preferably not less than 0.3 mass % and not larger than 0.8 mass %, and particularly preferably not less than 0.4 mass % and not larger than 0.7 mass %, as described above. The reasons for the above ranges of the contents of Cr and Mo are as described above. The content of Cr (Mo) is the amount of Cr (Mo) contained in the iron-based alloy when the total amount of the elements contained in the iron-based alloy is 100 mass %.

The average particle diameter of the iron-based alloy powder is, for example, not smaller than 50 μm and not larger than 150 μm. The iron-based alloy powder whose average particle diameter is within the above range is easy to be handled and easy to be pressure-molded. The iron-based alloy powder whose average particle diameter is not smaller than 50 μm is easy to ensure fluidity. The iron-based alloy powder whose average particle diameter is not larger than 150 μm is easy to provide a sintered member 1 of a dense structure. Furthermore, the average particle diameter of the iron-based alloy powder may be not smaller than 55 μm and not larger than 100 μm. The "average particle diameter" is a particle diameter (D50) of particles the cumulative volume of which is 50% in a volume particle size distribution measured by a laser diffraction particle size distribution measurement device. This also applies to the average particle diameters of Ni powder and C powder described later.

(Ni Powder)

The Ni powder may be pure Ni powder. The content of the Ni powder is maintained even after the sintering process described later. That is, the content of the Ni powder is maintained in the aforementioned sintered member 1. As described above, the content of the Ni powder is preferably larger than 2 mass % and not larger than 6 mass %, more preferably not less than 2.5 mass % and not larger than 5.5 mass %, and particularly preferably not less than 3 mass % and not larger than 5 mass %. When the content of the Ni powder is large, a part of Ni is alloyed with Fe during the sintering process while the remaining Ni is not alloyed but is present as pure Ni. Moreover, a multiphase structure including a martensitic phase and a retained austenite phase is formed. Therefore, the sintered member 1 having excellent toughness is easily manufactured. Moreover, since the content of the Ni powder is not excessively large, reduction in hardness is easily inhibited. Therefore, when the content of the Ni powder satisfies the above range, the sintered member 1 having both high strength and high toughness can be manufactured. The content of the Ni powder is the amount of the Ni powder contained in the material powder when the entirety of the material powder is 100 mass %.

The average particle diameter of the Ni powder has an influence on the distribution state of the retained austenite phase. The average particle diameter of the Ni powder is not smaller than 1 μm and not larger than 40 μm, for example. The Ni powder whose average particle diameter is not larger than 40 μm easily causes the retained austenite phase to be uniformly distributed. The Ni powder whose average particle diameter is not smaller than 1 μm is easy to be handled, whereby workability in manufacturing can be improved. The average particle diameter of the Ni powder is, furthermore, not smaller than 1 μm and not larger than 30 μm, and, particularly, not smaller than 1 μm and not larger than 20 μm.

(C Powder)

The C powder becomes an Fe—C liquid phase during a healing step in the sintering process, and rounds off edges of voids in the sintered member 1, thereby increasing hardness of the sintered member 1. The content of the C powder, similar to the Ni powder and the like, is maintained even after the sintering process described later. That is, the content of the C powder in the material powder is maintained in the aforementioned sintered member 1. As described above, the content of the C powder is, for example, preferably not less than 0.2 mass % and not larger than 1.0 mass %, more preferably not less than 0.3 mass % and not larger than 0.95 mass %, and particularly preferably not less than 0.4 mass % and not larger than 0.9 mass %.

The average particle diameter of the C powder is preferably smaller than the average particle diameter of the iron-based alloy powder. The C powder smaller than the iron-based alloy powder is easy to be uniformly distributed in the iron-based alloy powder, which allows alloying to be easily advanced. The average particle diameter of the C powder is, for example, not smaller than 1 μm and not larger than 30 μm, and, furthermore, not smaller than 10 μm and not larger than 25 μm. From the viewpoint of generating an Fe—C liquid phase, the average particle diameter of the C powder is preferred to be larger. However, if the average particle diameter of the C powder is excessively large, the time during which the liquid phase appears is increased, which may cause the voids to be excessively increased in size and become defects.

(Others)

The material powder may contain a lubricant. The lubricant increases lubricity of the material powder during molding, and improves moldability. Examples of the lubricant include higher fatty acid, metallic soap, fatty acid amide, higher fatty acid amide, and the like. As these lubricants, known lubricants can be used. The lubricant may exist in any form such as solid, powder, and liquid. Any of the above lubricants may be used alone or at least two of them may be used in combination. When the material powder is 100 mass %, the content of the lubricant in the material powder is, for example, not less than 0.1 mass % and not larger than 2.0 mass %, furthermore, not less than 0.3 mass % and not larger than 1.5 mass %, and, particularly, not less than 0.5 mass % and not larger than 1.0 mass %.

The material powder may contain an organic binder. Any of known organic binders can be used. When the material powder is 100 mass %, the content of the organic binder is not larger than 0.1 mass %. The content of the organic binder being not larger than 0.1 mass % allows the ratio of the metal powder contained in the powder compacted body to be increased, whereby dense powder compacted body is easily obtained. When the material powder contains no organic binder, the powder compacted body need not be degreased in a subsequent process.

[Sintering Process]

The sintering conditions are as described above. The cooling rate at the cooling step in the sintering process may be not lower than 1° C./sec, as described above. The cooling rate being not lower than 1° C./sec allows the sintered member 1 to be rapidly cooled. Therefore, a multiphase structure including a martensitic phase and a retained austenite phase is easily formed. Thus, the sintered member 1 excellent in hardness and toughness is manufactured. In particular, when the content of C is larger, the martensitic phase is more easily formed, which allows the sintered member 1 having higher hardness to be manufactured. When the content of the Ni powder is larger, the retained austenite phase is more easily formed, which allows the sintered member 1 having higher toughness to be easily manufactured. Moreover, rapid cooling of the sintered member 1 allows the sintered member 1 having a small variation width of Vickers hardness from the surface to the predetermined depth to be easily manufactured. Specifically, the sintered member 1 whose variation width of Vickers hardness is not larger than 50 HV is manufactured. The preferable cooling rate is as described above.

Advantageous Effects

The sintered member 1 of the present embodiment can have both high hardness and high toughness, in addition to the effects of Embodiment 1. The reasons are as follows. That is, the sintered member 1 is excellent in toughness because the content of Ni is large, and can inhibit reduction in hardness because the content of Ni is not excessively large. Furthermore, the sintered member 1 has the multiphase structure including the martensitic phase having high hardness and the retained austenite phase having high toughness. Moreover, the sintered member 1 has uniform hardness from the surface to the predetermined depth. The sintered member 1 has the small variation width of the Vickers hardness. Consequently, the sintered member 1 of the present embodiment can be suitably used as the first cam 110 (FIG. 6) included in the electromagnetic coupling 10.

Example of Analysis

In an example of analysis, how the magnitude of maximum stress acting on spline teeth varies depending on presence/absence of a tooth-missing part, was checked through FEM (Finite Element Method) analysis.

[Analysis Model No. 1]

A first member of Analysis Model No. 1 was composed of the sintered member 1 having been described with reference to FIG. 1 through FIG. 5. That is, the first member of this model includes: a plurality of tooth groups and a plurality of tooth-missing parts formed at an inner peripheral face connected to a first face; and a plurality of ball grooves formed at a second face. As for the plurality of tooth groups, the plurality of tooth-missing parts, and the plurality of ball grooves of the first member, the plurality of tooth groups 16, the plurality of tooth-missing parts 17, and the plurality of ball grooves 12*a* shown in FIG. 1 through FIG. 5 may be referred to as appropriate. The number of the tooth groups was 3, and the number of spline teeth in each tooth group was 8. The number of the tooth-missing parts was 3 which was the same as the number of the tooth groups. In each tooth-missing part, the number of missing spline teeth was 2. The number of the ball grooves was 3.

[Analysis Model No. 101]

A first member of Analysis Model No. 101 was identical to the first member of Analysis Model No. 1 except that it does not include tooth-missing parts at the inner peripheral face connected to the first face but includes a plurality of spline teeth disposed in parallel in the circumferential direction of the peripheral face. The number of the spline teeth was 30. The number of the ball grooves was 3.

[Stress Analysis]

Figure 10:
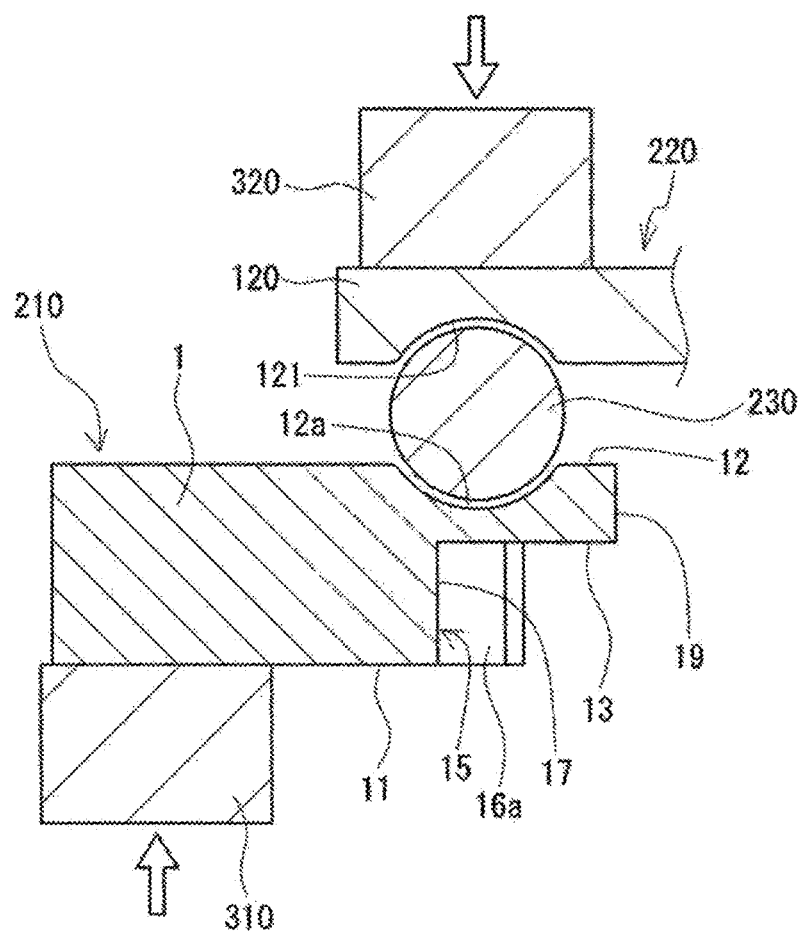
FIG. 10 illustrates a method of measuring the maximum stress that acts on spline teeth of a sintered member in an example of analysis.

The maximum stress acting on the spline teeth in each of the first members of the respective analysis models was checked as follows. A second member 220, a ball 230, a first jig 310, and a second jig 320 shown in FIG. 10 were prepared. FIG. 10 is a cross-sectional view showing the respective components being cut at the same position as in the cross-sectional view shown in FIG. 5. The second member 220 was composed of the second cam 120 described with reference to FIG. 6. That is, the second member 220 had a ball groove 121 in which a ball 230 is disposed. As shown in FIG. 10, the ball 230 was interposed between the ball groove 12*a* of the first member 210 and the ball groove 121 of the second member 220 in each analysis model. The ball 230 was placed in the ball groove 12*a* of the first member 210 at a position slightly shifted from the deepest part of the ball groove 12*a*, and was fixed to the part. The first jig 310 was disposed on the outer peripheral edge side of the first face 11 of the first member 210. The second jig 320 was disposed on the outer peripheral edge side, opposing the ball 230, of the surface on the side opposite to the ball groove 121 of the second member 220. The first member 210 and the second member 220 were pressed in the axial direction of the first member 210 by the first jig 310 and the second jig 320. At this time, the maximum stress acting on the spline teeth of the first member 210 was checked through FEM analysis. For the FEM analysis, Workbench Mechanical (manufactured by ANSYS, Inc) was used as software.

In the first member of Analysis Model No. 1, the maximum stress acted on the roots of the spline teeth. The maximum stress value was 281 MPa. Meanwhile, in the first member of Analysis Model No. 101, as in Analysis Model No. 1, the maximum stress acted on the roots of the spline teeth at the parts in the circumferential direction which overlapped the ranges in which the ball grooves were formed. The maximum stress value was 366 MPa. Thus, in the first member of Analysis Model No. 1, the maximum stress value acting on the roots of the spline teeth was about 16% reduced as compared to the first member of Analysis Model No. 101. Thus, it is found that the tooth-missing parts being disposed at the parts in the circumferential direction which overlapped the ranges in which the ball grooves were formed, can reduce stress concentration on the roots of the spline teeth.

Example of Test

In an example of test, sintered members were subjected to evaluation for hardness and toughness.

[Sample No. 1, Sample No. 2]

Sintered members of Sample No. 1 and Sample No. 2 were manufactured through a process of preparing a material powder, a process of manufacturing a powder compacted body, and a process of sintering the powder compacted body.

[Preparation Process]

Mixed powder containing iron-based alloy powder, Ni powder, and C powder was prepared as material powder.

The iron-based alloy powder contains a plurality of iron alloy particles composed of Cr and Mo, and the balance of Fe and inevitable impurities. The content of Cr and the content of Mo in the iron-based alloy are shown in Table 1. That is, the content of Cr in the iron-based alloy is 3.0 mass %, and the content of Mo in the iron-based alloy is 0.5 mass %. Table 1, "-" indicates that the iron-based alloy does not contain the corresponding element.

The content of the Ni powder and the content of the C powder in the material powder are shown in Table 1. In Sample No. 1, the content of the Ni powder is 3 mass %, the content of the C powder is 0.65 mass %, and the content of Fe powder is the balance. In Sample No. 2, the content of the Ni powder is 4 mass %, the content of the C powder is 0.75 mass %, and the content of Fe powder is the balance.

[Powder Compacted Body Manufacturing Process]

Powder compacted bodies were manufactured through pressure molding of the material powder. The molding pressure was 700 MPa.

[Sintering Process]

The powder compacted bodies were sintered to manufacture sintered members. For sintering of the powder compacted bodies, a continuous sintering furnace having a sintering furnace and a rapid cooling chamber connected downstream of the sintering furnace, was used. As for the sintering conditions, the sintering temperature was 1300° C., and the sintering time was 15 minutes.

(Cooling Step)

At a cooling step in the sintering process, sinter hardening was performed to rapidly cool the sintered members. Specifically, the cooling rate was 3° C./sec until the atmospheric temperature reached 300° C. from the start of cooling. This cooling was performed by spraying nitrogen gas as cooling gas to the sintered members.

[Sample No. 101, Sample No. 102]

Sintered members of Sample No. 101 and Sample No. 102 were manufactured in the same manner as that for the sintered member of Sample No. 1 except that the content of the Ni powder and the content of the C powder in the prepared material powder were different from those of Sample No. 1. Specifically, in Sample No. 101, the content of the Ni powder in the material powder was 1 mass %, and the content of the C powder in the material powder was 0.7 mass %. In Sample No. 102, the content of the Ni powder in the material powder was 2 mass %, and the content of the C powder in the material powder was 0.7 mass %.

[Sample No. 110]

A sintered member of Sample No. 110 was manufactured in the same manner as that for Sample No. 2 except for the following points (a) to (e).

(a) The composition of the prepared iron-based alloy powder did not contain Cr but contained Ni and Cu.
(b) The material powder did not contain Ni powder.
(c) The content of the C powder in the material powder was different from that of Sample No. 2.
(d) Not rapid cooling but slow cooling was performed in the cooling step in the sintering process.
(e) After the sintering process, quenching and tempering were performed.

The iron-based alloy powder contains a plurality of iron alloy particles composed of Cu, Mo, and Ni, and the balance of Fe and inevitable impurities. The content of Cu in the iron-based alloy is 1.5 mass %, and the content of Mo in the iron-based alloy is 0.5 mass %. The content of Ni in the iron-based alloy is 4 mass %. In Sample No. 110, the content of the C powder in the material powder is 0.5 mass %, and the content of Fe powder is the balance.

At the cooling step in the sintering process, the sintered member was cooled not rapidly but slowly. The cooling rate was about 0.5° C./sec.

[Measurement of Apparent Density]

An apparent density (g/cm$^3$) of the sintered member of each sample was measured by the Archimedes method. The apparent density was obtained by "(dry weight of sintered member)/{(dry weight of sintered member)—(underwater weight of oil-immersed sintered member)}×density of water". The underwater weight of the oil-immersed sintered member is the weight of the sintered member that has been immersed and impregnated in oil and then immersed in water. N (number of samples) was 3. An average of measurement results of three sintered members (samples) was obtained as the apparent density of the sintered member corresponding to each Sample No. The results are shown in Table 1.

[Evaluation of Hardness]

The hardness of each sintered member was evaluated by obtaining Vickers hardness of the sintered member, and the variation width of the Vickers hardness from the surface of the sintered member to the predetermined depth.

The Vickers hardness was measured on the basis of JIS Z 2244 (2009). A test piece was cut out from each sintered member. The shape of the test piece was rectangle. The size of the test piece was 55 mm×10 mm× 10 mm (thickness). The test piece was cut out such that one face in the thickness direction of the test piece was the surface of the sintered member.

Vickers hardness was measured at 11 points in a range from the surface of the test piece to the predetermined depth at the cross section of the test piece. The surface of the test piece was the aforementioned one face in the thickness direction of the test piece. The predetermined depth was 5.0 mm along a direction orthogonal to the surface of the test piece. The measurement points were: a point 0.1 mm apart from the surface; and ten points spaced apart from each other at a pitch of 0.5 mm from the surface. N (number of samples) was 3.

An average of the Vickers hardnesses measured at all the measurement points in three test pieces was obtained as the Vickers hardness of the corresponding sintered member. A difference between the maximum value and the minimum value of the averages of the Vickers hardnesses at the respective measurement points of the three test pieces was obtained as the variation width of the Vickers hardness of the corresponding sintered member. The results are shown in Table 1.

Figure 7:
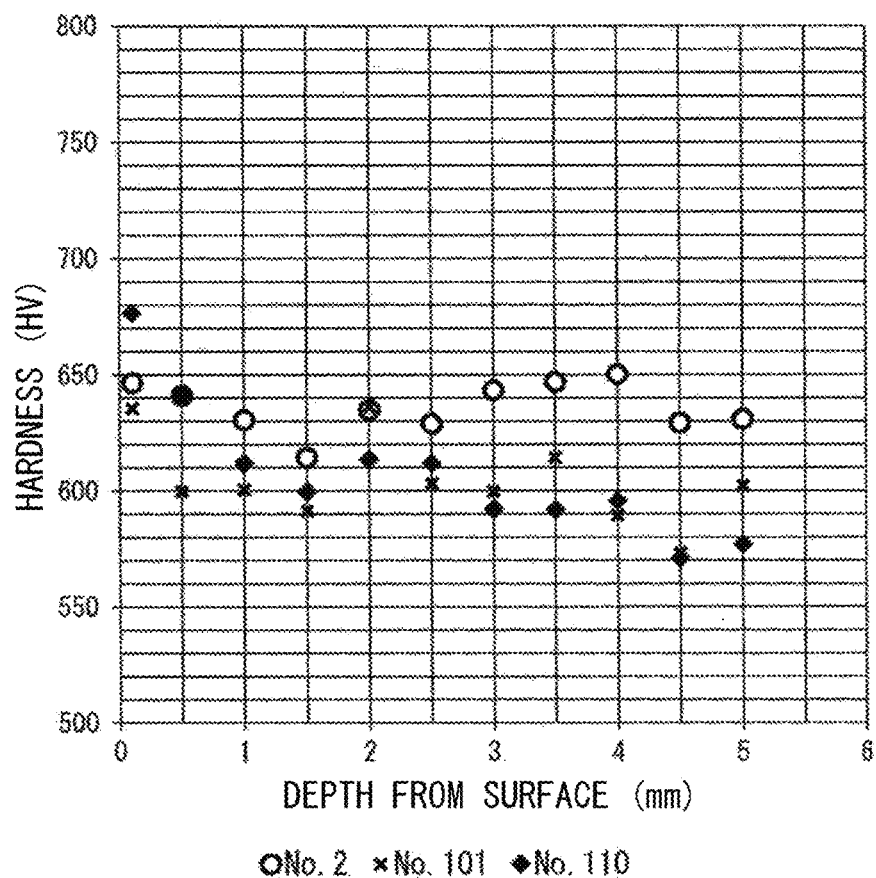
FIG. 7 is a graph showing Vickers hardness of a sintered member of Sample No. 2, Vickers hardness of a sintered member of Sample No. 101, and Vickers hardness of a sintered member of Sample No. 110 according to Embodiment 2.
Figure 8A:
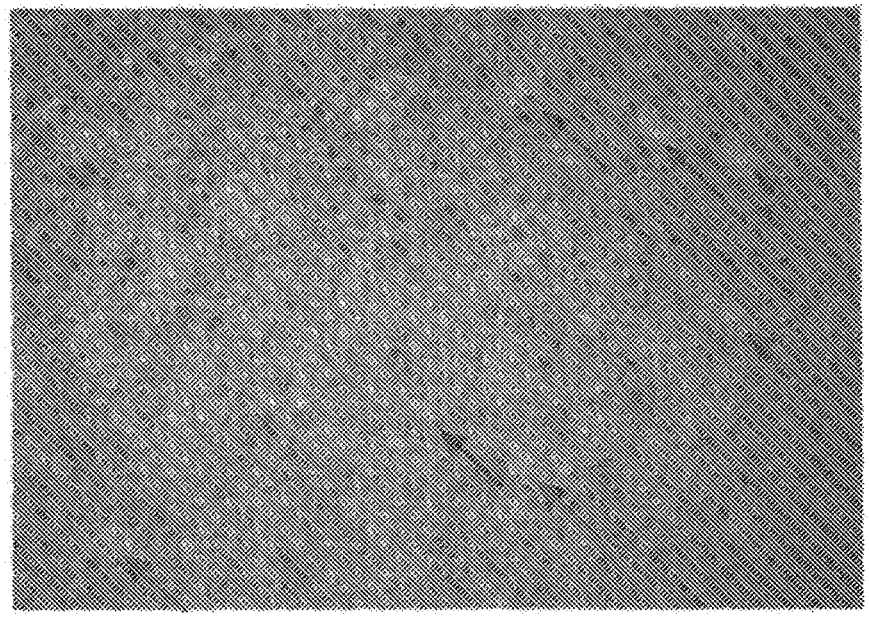
FIG. 8A is a micrograph showing a cross section of a sintered member of Sample No. 1 according to Embodiment 2.
Figure 8B:
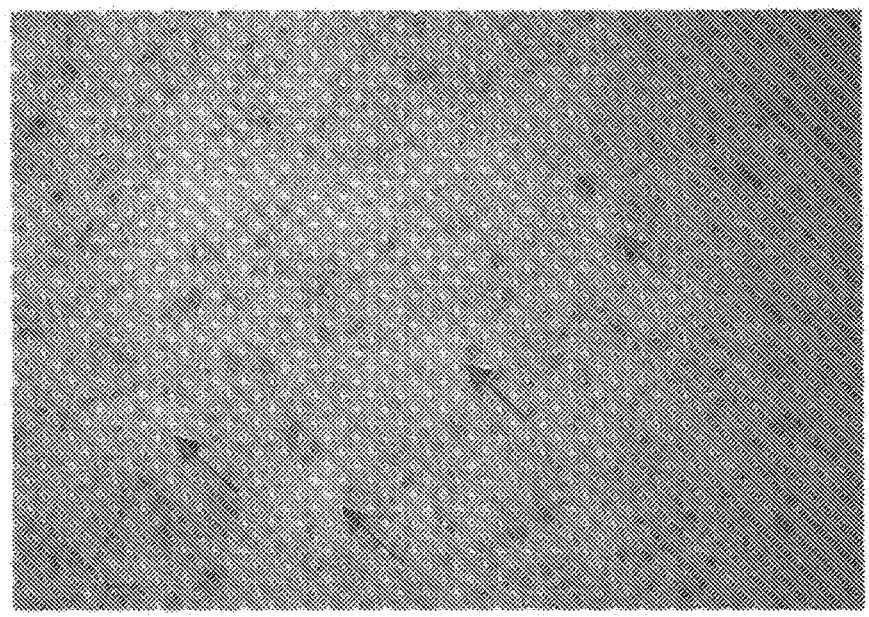
FIG. 8B is a micrograph showing a cross section of the sintered member of Sample No. 1 according to Embodiment 2.
Figure 9A:
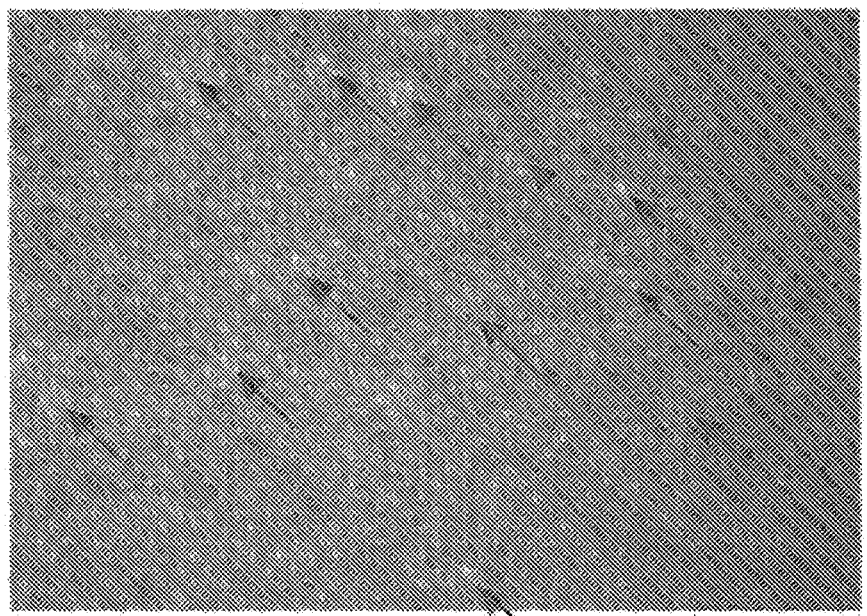
FIG. 9A is a micrograph sowing a cross section of a sintered member of Sample No. 2 according to Embodiment 2.
Figure 9B:
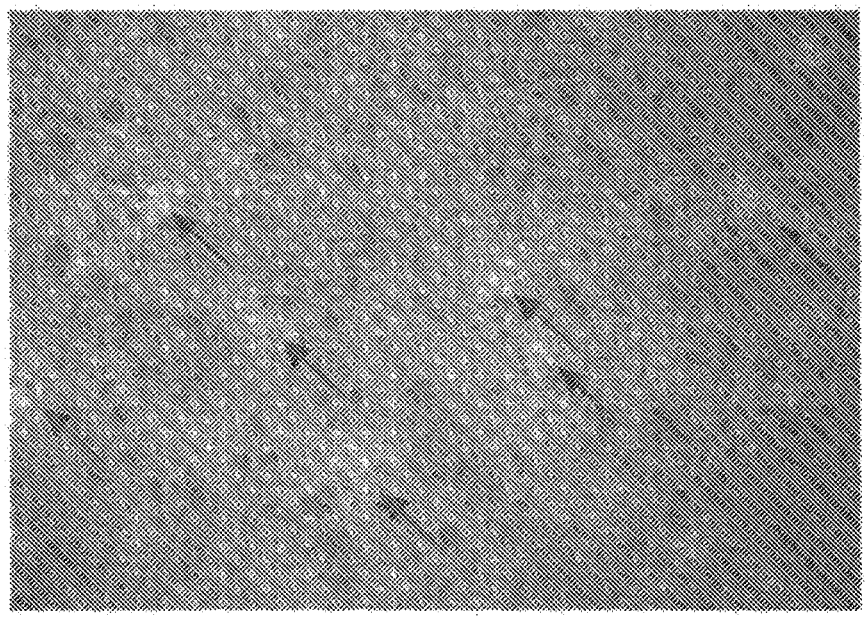
FIG. 9B is a micrograph sowing a cross section of the sintered member of Sample No. 2 according to Embodiment 2.

Regarding the sintered members of Sample No. 2, Sample No. 101, and Sample No. 110 as representatives, the averages of the Vickers hardnesses at the respective measurement points in the three test pieces are shown by circles, crosses, and black rhombuses in FIG. 7. In the graph shown in FIG. 7, the horizontal axis indicates depth (mm) from the surface, and the vertical axis indicates Vickers hardness (HV).

[Evaluation of Toughness]

The toughness of each sintered member was evaluated by measuring the stress amplitude through an Ono-type rotating bending fatigue test.

The Ono-type rotating bending fatigue test was performed on the basis of JIS Z 2274 (1978) by using FTO-100 manufactured by TOKYO KOKI TESTING MACHINE CO. LTD., as a testing machine. A test piece was cut out from each sintered member. The test piece conforms to No. 1 test piece specified in JIS Z 2274 (1978). Specifically, the test piece has a dumbbell-like shape. This test piece has a pair of large-diameter parts and a small-diameter part. The large-diameter parts are disposed at opposed ends in the axial direction of the test piece. Each large-diameter part has a cylindrical shape. The diameter of each large-diameter part is uniform in the axial direction of the large-diameter part. The small-diameter part is disposed between the opposed large-diameter parts. The large-diameter parts and the small-diameter part are continuous with each other. The small-diameter part has a cylindrical shape. The small-diameter part has a parallel part and a pair of curved parts. The parallel part is a uniform-diameter part disposed at the center in the axial direction of the small-diameter part, along the axial direction. Each curved part connects the parallel part with each large-diameter part, and has a diameter gradually increasing from the parallel part side toward the large-diameter part side. The length in the axial direction of the test piece was 90.18 mm. The length in the axial direction of each large-diameter part was 27.5 mm, and the length in the axial direction of the small-diameter part was 35.18 mm. The diameter of each large-diameter part was 12 mm. The diameter of the parallel part was 8 mm. The length of the parallel part was 16 mm.

As for measurement conditions, the number of revolutions was 3400 rpm. The maximum stress amplitude at which the test piece was not broken after 10$^7$ times of repetition of bending, was measured. N (number of samples) was 3. An average of stress amplitudes measured for three test pieces was obtained as the stress amplitude of the sintered member. The results are shown in Table 1.

[Observation of Cross Section]

The cross sections of the sintered members of Sample No. 1, Sample No. 2, Sample No. 101, and Sample No. 102 were observed.

The cross section of each sintered member was an arbitrary cross section. The cross section was exposed as follows. That is, a test pieces obtained by cutting a part of the sintered member was embedded in an epoxy resin to manufacture a resin molded body. The resin molded body was subjected to polishing. The polishing was performed in two steps. In the first polishing step, the resin of the resin molded body was polished until the cross section of the sintered member was exposed. In the second polishing step, the exposed cross section was polished. Mirror polishing was adopted. That is, the cross section observed was a mirror-polished surface.

An optical microscope (GX51) manufactured by Olympus Corporation was used for observation of the cross section. FIG. 8A and FIG. 8B, FIG. 9A and FIG. 9B, FIG. 11, and FIG. 12 show micrographs at the cross sections of the sintered members of Sample No. 1, Sample No. 2, Sample No. 101, and Sample No. 102, respectively. Each of the micrographs shown in FIG. 8A, FIG. 9A, FIG. 11, and FIG. 12 has a size of about 2.82 mm×2.09 mm. Each of the micrographs shown in FIG. 8B and FIG. 9B has a size of about 1.38 mm×1.02 mm.

Figure 11:
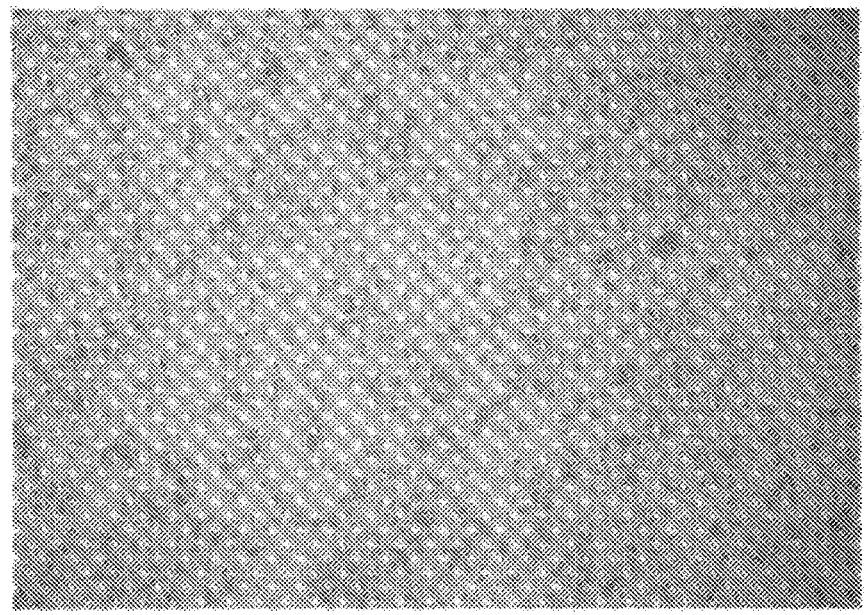
FIG. 11 is a micrograph showing a cross section of a sintered member of Sample No. 101.

From the micrographs, presence/absence of the retained austenite phase in the four samples was confirmed. In the micrographs, the retained austenite phase is indicated by arrows, for convenience of description. A white part indicated ahead of each arrow is the retained austenite phase. A part surrounding each white part is the martensitic phase. Since no retained austenite phase is seen in FIG. 11, no arrows are appended.

The area ratio of the retained austenite phase in each of the five samples was obtained. Here, a portable X-ray residual stress measurement device (μ-X360) manufactured by Pulstec Industrial Co., Ltd. was used, and the ratio of the total area of the retained austenite phase to the whole area of a measurement field was obtained. The number of measurement fields was 2. The size of each measurement field was 2 mm in diameter. An average of the ratios of the total areas of the retained austenite phase at the respective measurement fields was obtained as the area ratio of the retained austenite phase. The result is shown in Table 1.

12 second face
12a ball groove
13 third face
15 peripheral face
16 tooth group
16a spline teeth
17 tooth-missing part
19 hole
Cp pitch circle
Cr root circle
Ta tooth thickness
Wa width of tooth groove
La length of tooth group
Lb length of tooth-missing part
Lc length of ball groove
10 electromagnetic coupling
110 first cam
120 second cam
121 ball groove
130 ball
210 first member
220 second member
230 ball
310 first jig
320 second jig

TABLE 1

| | Material powder | | | | | | Sintered member | | | |
|---|---|---|---|---|---|---|---|---|---|---|
| | Iron-based alloy powder | | | | Ni | C | | Vickers hardness | | Retained austenite phase |
| Sample No. | Cr mass % | Cu mass % | Mo mass % | Ni mass % | powder mass % | powder mass % | Density g/cm³ | Average HV | Variation width HV | Stress amplitude Mpa | Area ratio % |
| 1 | 3.0 | — | 0.5 | — | 3 | 0.65 | 7.20 | 643 | 42 | 422 | 21 |
| 2 | 3.0 | — | 0.5 | — | 4 | 0.75 | 7.23 | 636 | 36 | 428 | 25 |
| 101 | 3.0 | — | 0.5 | — | 1 | 0.7 | 7.15 | 604 | 63 | 378 | 14 |
| 102 | 3.0 | — | 0.5 | — | 2 | 0.7 | 7.10 | 650 | 48 | 415 | 16 |
| 110 | — | 1.5 | 0.5 | 4 | — | 0.5 | 7.21 | 608 | 106 | 398 | 43 |

As shown in Table 1, the sintered members of Sample No. 1 and Sample No. 2 are higher in the Vickers hardness, smaller in the variation width of the Vickers hardness, and larger in the stress amplitude than the sintered members of Sample No. 101, Sample No. 102, and Sample No. 110.

Figure 12:
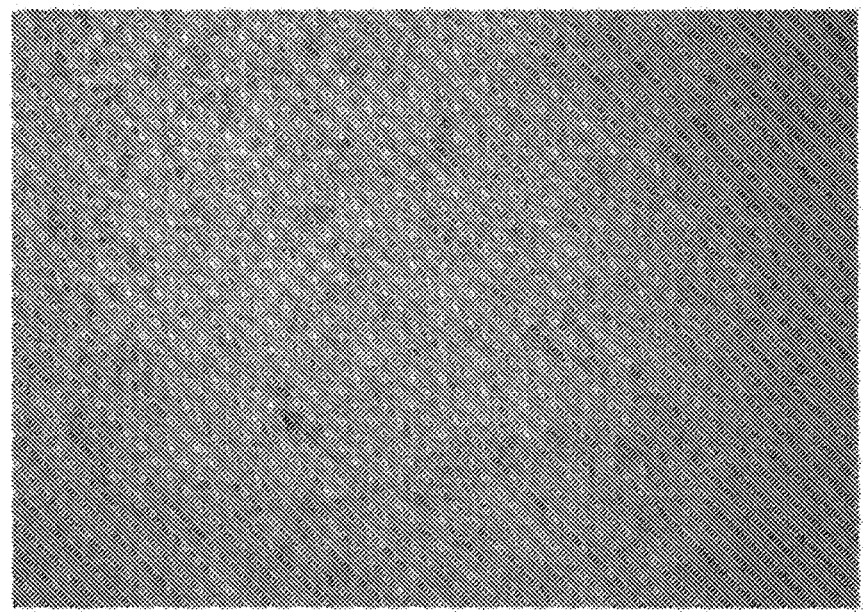
FIG. 12 is a micrograph showing a cross section of a sintered member of Sample No. 102.

As shown in FIG. 8A, FIG. 8B, FIG. 9A, and FIG. 9B, it was found that the sintered members of Sample No. 1 and Sample No. 2 each had the multiphase structure including the martensitic phase and the retained austenite phase. Meanwhile, as shown in FIG. 11 and FIG. 12, it was found that the sintered members of Sample No. 101 and Sample No. 102 each included little or no retained austenite phase, and were substantially composed of the martensitic phase. The area ratios of the retained austenite phase in the sintered members of Sample No. 1 and Sample No. 2 were higher than those in the sintered members of Sample No. 101 and Sample No. 102.

The present disclosure is not limited to these examples, and is defined by the scope of the claims and intended to include meaning equivalent to the scope of the claims and all modifications within the scope.

REFERENCE SIGNS LIST 1 sintered member
11 first face

The invention claimed is:

1. A sintered member having an annular shape, comprising:
    a first face facing one side in an axial direction;
    a second face facing the other side in the axial direction;
    an inner peripheral face connected to an inner peripheral edge of the first face; and
    a plurality of tooth groups and a plurality of tooth-missing parts which are alternately disposed along a circumferential direction of the inner peripheral face, wherein
    the second face includes a plurality of ball grooves arranged in parallel in the circumferential direction,
    each tooth group includes a plurality of spline teeth that are continuous in the circumferential direction of the peripheral face,
    the number of the plurality of tooth-missing parts is the same as the number of the plurality of ball grooves,
    positions in a radial direction in which the plurality of tooth-missing parts are formed are within ranges in the radial direction in which the plurality of ball grooves are formed, and
    ranges in the circumferential direction in which the plurality of tooth-missing parts are formed overlap ranges in the circumferential direction in which the plurality of ball grooves are formed.

2. The sintered member according to claim 1, wherein a variation width of Vickers hardness up to a depth of 5.0 mm along a direction orthogonal to a surface of the sintered member is not larger than 100 HV.

3. The sintered member according to claim 2, having a composition containing Ni, Cr, Mo, and C, and a balance of Fe and inevitable impurities, wherein
under a condition a total content of elements contained in the sintered member is 100 mass %, a content of Ni in the sintered member is larger than 2 mass % and not larger than 6 mass %.

4. The sintered member according to claim 3, wherein
a content of Cr is not less than 2 mass % and not larger than 4 mass %,
a content of Mo is not less than 0.2 mass % and not larger than 0.9 mass %, and
a content of C is not less than 0.2 mass % and not larger than 1.0 mass %.

5. The sintered member according to claim 4, having a multiphase structure including a martensitic phase and a retained austenite phase, wherein
an area ratio of the retained austenite phase at an arbitrary cross section of the sintered member is not lower than 5%.

6. The sintered member according to claim 3, having a multiphase structure including a martensitic phase and a retained austenite phase, wherein
an area ratio of the retained austenite phase at an arbitrary cross section of the sintered member is not lower than 5%.

7. An electromagnetic coupling comprising:
a first cam;
a second cam; and
a ball interposed between the first cam and the second cam, wherein
the first cam being a sintered member having an annular shape, the sintered member including
a first face facing one side in an axial direction,
a second face facing the other side in the axial direction,
an inner peripheral face connected to an inner peripheral edge of the first face, and
a plurality of tooth groups and a plurality of tooth-missing parts which are alternately disposed along a circumferential direction of the inner peripheral face, wherein
the second face includes a plurality of ball grooves arranged in parallel in the circumferential direction,
each tooth group includes a plurality of spline teeth that are continuous in the circumferential direction of the peripheral face,
the number of the plurality of tooth-missing parts is the same as the number of the plurality of ball grooves,
positions in a radial direction in which the plurality of tooth-missing parts are formed are within ranges in the radial direction in which the plurality of ball grooves are formed, and
ranges in the circumferential direction in which the plurality of tooth-missing parts are formed overlap ranges in the circumferential direction in which the plurality of ball grooves are formed.

8. The electromagnetic coupling according to claim 7, wherein a variation width of Vickers hardness up to a depth of 5.0 mm along a direction orthogonal to a surface of the sintered member is not larger than 100 HV.

9. The electromagnetic coupling according to claim 8, wherein the sintered member has a composition containing Ni, Cr, Mo, and C, and a balance of Fe and inevitable impurities, wherein
under a condition a total content of elements contained in the sintered member is 100 mass %, a content of Ni in the sintered member is larger than 2 mass % and not larger than 6 mass %.

10. The electromagnetic coupling according to claim 9, wherein the sintered member has
a content of Cr is not less than 2 mass % and not larger than 4 mass %,
a content of Mo is not less than 0.2 mass % and not larger than 0.9 mass %, and
a content of C is not less than 0.2 mass % and not larger than 1.0 mass %.

11. The electromagnetic coupling according to claim 10, wherein the sintered member has
a multiphase structure including a martensitic phase and a retained austenite phase, and
an area ratio of the retained austenite phase at an arbitrary cross section of the sintered member is not lower than 5%.

12. The electromagnetic coupling according to claim 9, wherein the sintered member has
a multiphase structure including a martensitic phase and a retained austenite phase, and
an area ratio of the retained austenite phase at an arbitrary cross section of the sintered member is not lower than 5%.

* * * * *